F. M. SMITH.
DOUBLE SEATED VALVE.
APPLICATION FILED SEPT. 14, 1908.

919,480.

Patented Apr. 27, 1909.

Witnesses.

Inventor.
Francis M. Smith.
Attorney

UNITED STATES PATENT OFFICE.

FRANCIS M. SMITH, OF MAYGER, OREGON, ASSIGNOR OF ONE-FOURTH TO GEORGE G. MAYGER AND ONE-FOURTH TO LOUIS FLUHRER, BOTH OF MAYGER, OREGON.

DOUBLE-SEATED VALVE.

No. 919,480.   Specification of Letters Patent.   Patented April 27, 1909.

Application filed September 14, 1908. Serial No. 452,844.

*To all whom it may concern:*

Be it known that I, FRANCIS M. SMITH, a citizen of the United States, residing at Mayger, in the county of Columbia and State of Oregon, have invented a new and useful Improvement in Double - Seated Valves, of which the following is a specification, reference being had to the accompanying drawings.

My invention relates to that class of valves controlling the passage of fluids through pipes.

The object of my invention is to provide a better means to retain double seated valves in position where they may be placed, and is an improvement upon the device and arrangement of double-seated valve illustrated and described in certain Letters Patent No. 879,014 granted to me February 11, 1908, for double-seated valve. I attain these objects and other advantages by the mechanism, construction, combination, and arrangement of parts illustrated in the accompanying drawings, which form a part hereof.

Figure 1:
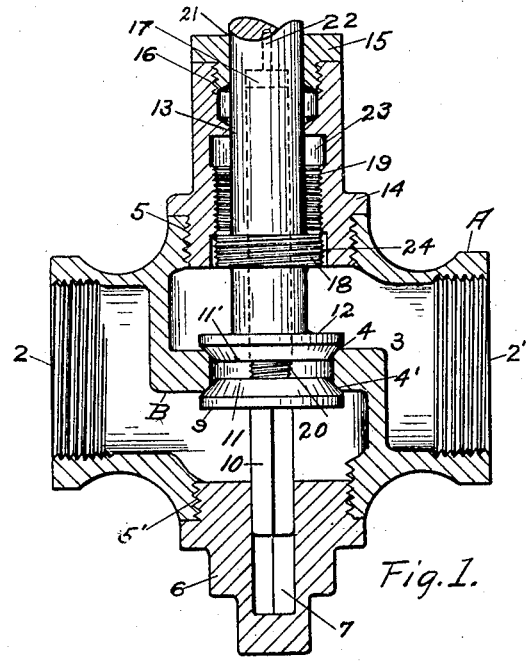
Figure 2:
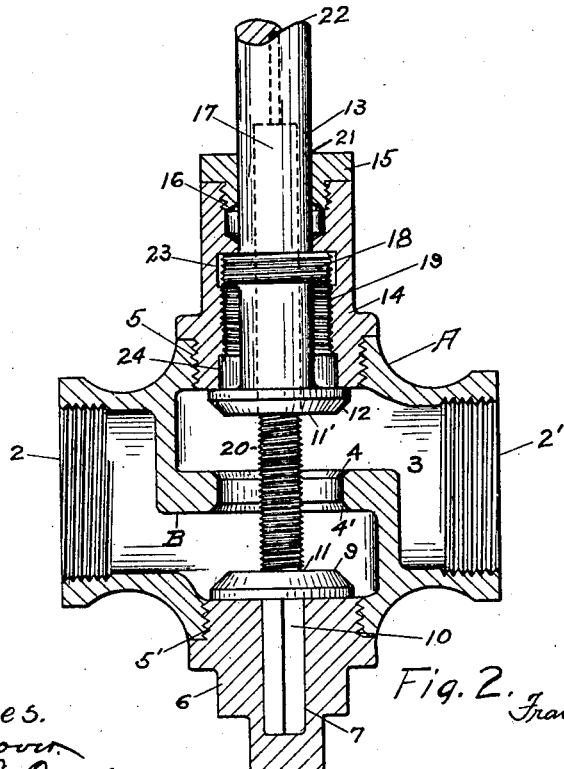

Figure 1 is a longitudinal sectional view of my valve in closed position. Fig. 2 is a like view with valve open.

Like letters and numerals refer to like parts in both figures.

A is a valve casing or shell having openings 2—2' provided with threads to receive the threaded ends of pipes in forming a joint of a fluid pipe line through the casing. B is an integral wall extending from the side of the fluid passage 3 at one side of the upper gland opening 5, to the center of the passage, thence at right angles thereto longitudinally with the passage and thence again at right angles, to a place on the side of the fluid passage 3 at the opposite side of the plug opening 5'. The central part of the wall B has a valve port through it, the upper side of which is formed with a downward receiving valve seat 4 and the lower side with an upward receiving valve seat 4'. The casing or shell A has threaded openings 5—5' above and below the valve port and in alinement therewith. Through these openings the valves are placed within the casing on opposite sides of the wall B.

A threaded plug 6 is screwed into the lower opening 5'. This plug has a vertical square recess 7 in its center, opening into the casing, and in alinement with the valve seats. A valve 9 with an upward seating face 11 is placed in the casing below the wall B. This valve is provided with an integral, vertical stem 20 extending above it and through the port and opening 5, also below the valve a suitable distance into the squared recess 7 of the plug 6. The stem above the valve is threaded while below the valve the part 10 is squared in form to enter the recess 7.

A threaded gland 14 is screwed into the upper opening 5 of the casing and an auxiliary threaded gland 15 is screwed into a threaded opening 16 in the upper part of the gland 14. A vertical opening 21 extends through the auxiliary gland 15 in the usual manner. A valve 12 with a downward seating face 11' is placed within the casing above the wall B. The valve 12 has an integral hollow stem 13 extending through the openings 16 and 21 of the glands, without the same. A suitable handle or lever may be placed upon the exterior end. The stem 13 is threaded upon its inner surface to receive the thread of the opposing valve stem 20. The stem 13 also has an enlarged threaded part 18 on its outer surface near the center thereof. The gland 14 has a thread 19 on its inner surface for a suitable distance along its central portion. Above and below the threaded portion are the enlarged openings 23 and 24 respectively. An oil hole 22 extends from the top of the stem 13 vertically through it to the opening therein receiving the valve screw 20.

It will now be seen that upon turning the valve stem 13 while in the position set out in Fig. 1, if the liquid pressure is upon the lower side of the valve 9 the threaded interior of the stem engages the thread of the upper part of the stem 20 of the lower valve and causes the valve 12 to rise from its seat 4 and during this time the threaded part 18 on the exterior of the stem 13 engages the thread 19 of the gland 14. When the valve 12 is thus raised until the part 18 has entered the upper opening 23 of the gland the upper surface of the valve stem 12 engages the lower surface of the gland 14 and rises no farther. Thereupon the stem 13 continuing in a fixed position to revolve upon the thread of the lower valve stem 20 in a direction to unscrew from the same causes the valve 9 to descend from its seat 4', its lower squared stem entering the recess 7 of the lower plug 6. The valves are then in the position shown in Fig. 2. If there is no pressure upon the lower surface of the valve 9 the revolving of the stem 13 of the upper valve in the manner just described will cause the lower valve to descend of its own gravity as it cannot be revolved by reason of its lower squared end. It will also be seen that by reversing the revolution of the stem 13 the valves will advance oppositely to their respective seats by the same means as described to open them. They will then be in the closed position shown in Fig. 1.

It will be noted that by my device the valves may be separated from the valve seats to any desired position and retained in that position without any movement upward or downward or any rattling about in the casing. Thus the port may be opened accurately to any extent desired and may be securely closed without any lost motion in the valve mechanism.

Having thus fully described my invention, I claim:

1. In a double-seated valve of the character described, the combination with a shell formed with opposite pipe receiving openings 2, 2', upper and lower openings 5, 5' and an integral, interior right angled pipe wall B formed with a ported central, longitudinal section having upper and lower valve seats 4, 4', of a valve mechanism comprising a gland 14 screwed into the shell opening 5 and having an opening through it threaded a suitable distance and openings immediately above and below the gland thread of larger diameter than the same, a plug 6 screwed into the lower shell opening 5' and formed with an inner vertical squared recess therein, an upper valve 12 having a vertical cylindrical stem with an opening through valve and stem, threaded a sufficient distance to engage the stem of a lower valve at any position thereof from entire closure to entire opening of the latter, also an enlarged exterior threaded part on said stem of form and dimension that it may engage said gland thread and rotate freely above and below same, a lower valve having a lower squared stem 10 formed to enter the squared recess of the plug 6, and an upper stem threaded and of form to enter and engage the inner thread of the upper valve stem, also hand operating mechanism secured to said upper valve stem, substantially as described.

2. In a double-seated valve of the character described, a valve mechanism comprising a gland 14 screwed into a shell opening 5 and having an opening through it threaded a suitable distance and openings immediately above and below the gland thread of larger diameter than the same, a plug 6 screwed into a lower shell opening 5' and formed with an inner vertical squared recess therein, an upper valve 12 having a vertical cylindrical stem with an opening through valve and stem, threaded a sufficient distance to engage the stem of a lower valve at any position thereof from entire closure to entire opening of the latter, also an enlarged exterior threaded part on said stem of form and dimension that it may engage said gland thread and rotate freely above and below same, a lower valve having a lower squared stem 10 formed to enter the squared recess of the plug 6, and an upper stem threaded and of form to enter and engage the inner threaded upper valve stem, substantially as described.

3. In a double-seated valve provided with a threaded upper gland and openings therein immediately above and below the threaded part of larger diameter, an upper valve stem having an enlarged, integral threaded part 18, in position thereon and formed, either to engage said gland thread or rotate freely in the openings above and below it.

FRANCIS M. SMITH.

Witnesses:
MAX MAISON,
C. W. WORLEY.